US012191061B2

(12) United States Patent
Hirukawa

(10) Patent No.: US 12,191,061 B2
(45) **Date of Patent: *Jan. 7, 2025**

(54) MULTILAYER COIL COMPONENT

(71) Applicant: Murata Manufacturing Co., Ltd., Kyoto-fu (JP)

(72) Inventor: Atsuo Hirukawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,516

(22) Filed: Feb. 6, 2024

(65) Prior Publication Data

US 2024/0177910 A1 May 30, 2024

Related U.S. Application Data

(63) Continuation of application No. 17/937,707, filed on Oct. 3, 2022, now Pat. No. 11,929,195, which is a continuation of application No. 16/881,875, filed on May 22, 2020, now Pat. No. 11,495,383.

(30) Foreign Application Priority Data

May 24, 2019 (JP) ................................ 2019-097644

(51) Int. Cl.
*H01F 17/00* (2006.01)
*H01F 27/29* (2006.01)

(52) U.S. Cl.
CPC ....... *H01F 17/0013* (2013.01); *H01F 27/292* (2013.01)

(58) Field of Classification Search
CPC ........................... H01F 17/0013; H01F 27/292
See application file for complete search history.

(56) References Cited

U.S. PATENT DOCUMENTS

| | | | | |
|---|---|---|---|---|
| 6,147,573 A * | 11/2000 | Kumagai | H03H 7/0115 336/200 |
| 2005/0122699 A1* | 6/2005 | Maeda | H01F 17/0013 174/262 |
| 2007/0164843 A1* | 7/2007 | Yagisawa | H01Q 19/09 336/83 |

(Continued)

FOREIGN PATENT DOCUMENTS

| | | |
|---|---|---|
| CN | 110349733 A | 10/2019 |
| CN | 212659379 U | 3/2021 |

(Continued)

*Primary Examiner* — Malcolm Barnes
(74) *Attorney, Agent, or Firm* — Studebaker & Brackett PC

(57) ABSTRACT

A multilayer coil component includes a multilayer body that contain a coil. The coil includes coil conductors. A lamination direction of the multilayer body and an axial direction of the coil are parallel to a first main surface. A distance between the coil conductors adjacent to each other in the lamination direction is from 4 μm to 8 μm. Each coil conductor includes a line portion and a land portion that is disposed at an end portion of the line portion. The land portions of the coil conductors adjacent to each other in the lamination direction are connected to each other with a via conductor interposed therebetween. A width of the line portion is from 30 μm to 50 μm. An inner diameter of each coil conductor is from 50 μm to 100 μm.

17 Claims, 8 Drawing Sheets

(56) References Cited

U.S. PATENT DOCUMENTS

| | | | | |
|---|---|---|---|---|
| 2012/0313743 | A1* | 12/2012 | Kimura | H01F 17/0013 336/200 |
| 2015/0371755 | A1* | 12/2015 | Im | H01F 27/292 336/200 |
| 2016/0293301 | A1* | 10/2016 | Choto | H01F 17/0013 |
| 2017/0047160 | A1* | 2/2017 | Kim | H01F 41/046 |
| 2017/0103846 | A1* | 4/2017 | Yoneda | H01F 41/043 |
| 2017/0345552 | A1* | 11/2017 | Nakano | H01F 41/043 |
| 2018/0012696 | A1* | 1/2018 | Lee | H01F 17/0013 |
| 2019/0237239 | A1* | 8/2019 | Kato | H01F 17/0013 |
| 2019/0333686 | A1* | 10/2019 | Kazuta | H01F 27/292 |
| 2020/0373070 | A1* | 11/2020 | Hirukawa | H01F 17/0013 |

FOREIGN PATENT DOCUMENTS

| | | | | |
|---|---|---|---|---|
| JP | 09129447 | A | * | 5/1997 |
| JP | H09-129447 | A | | 5/1997 |
| JP | 11307344 | A | * | 11/1999 |
| JP | H11307344 | A | | 11/1999 |
| JP | 2016139742 | A | * | 8/2016 |

* cited by examiner

MULTILAYER COIL COMPONENT

CROSS-REFERENCE TO RELATED APPLICATION

This application is a Continuation of U.S. patent application Ser. No. 17/937,707, filed on Oct. 3, 2022, which is a Continuation of U.S. patent application Ser. No. 16/881,875, filed on May 22, 2020, which claims benefit of priority to Japanese Patent Application No. 2019-097644, filed May 24, 2019, the entire content of which is incorporated herein by reference.

BACKGROUND

Technical Field

The present disclosure relates to a multilayer coil component.

Background Art

In recent years, the communication speed of electrical devices has increased and the size thereof has increased. There is accordingly a need for a multilayer inductor that has sufficient high-frequency characteristics in a high frequency band (for example, a GHz band of 50 GHz or more).

Japanese Unexamined Patent Application Publication No. 9-129447 discloses a multilayer inductor in which the lamination direction of an insulating member and the axial direction of a coil are parallel to a mounting surface as an example of the multilayer coil component.

SUMMARY

In the multilayer inductor disclosed in Japanese Unexamined Patent Application Publication No. 9-129447, an outer electrode is formed by, for example, sputtering or vacuum deposition on both end portions of a multilayer body. However, there is a possibility that the multilayer inductor disclosed in Japanese Unexamined Patent Application Publication No. 9-129447 does not have sufficient high-frequency characteristics at a GHz band of 50 GHz or more.

Accordingly, the present disclosure provides a multilayer coil component that is excellent in high-frequency characteristics.

According to preferred embodiments of the present disclosure, a multilayer coil component includes a multilayer body that includes insulating layers laminated in a length direction and that contain a coil, and a first outer electrode and a second outer electrode that are electrically connected to the coil. The coil includes coil conductors that are laminated in the length direction together with the insulating layers and that are electrically connected to each other. The multilayer body has a first end surface and a second end surface that face away from each other in the length direction, a first main surface and a second main surface that face away from each other in a height direction perpendicular to the length direction, and a first side surface and a second side surface that face away from each other in a width direction perpendicular to the length direction and the height direction. The first outer electrode covers at least a part of the first end surface. A lamination direction of the multilayer body and an axial direction of the coil are parallel to the first main surface. A distance between the coil conductors adjacent to each other in the lamination direction is no less than 4 μm and no more than 8 μm (i.e., from 4 μm to 8 μm). Each coil conductor includes a line portion and a land portion that is disposed at an end portion of the line portion. The land portions of the coil conductors adjacent to each other in the lamination direction are connected to each other with a via conductor interposed therebetween. A width of the line portion is no less than 30 μm and no more than 50 μm (i.e., from 30 μm to 50 μm). An inner diameter of each coil conductor is no less than 50 μm and no more than 100 μm (i.e., from 50 μm to 100 μm).

According to the present disclosure, a multilayer coil component that is excellent in high-frequency characteristics can be provided.

Other features, elements, characteristics and advantages of the present disclosure will become more apparent from the following detailed description of preferred embodiments of the present disclosure with reference to the attached drawings.

DETAILED DESCRIPTION

A multilayer coil component according to an embodiment of the present disclosure will hereinafter be described.

The present disclosure, however, is not limited to the embodiment described below and can be appropriately changed and carried out without departing from the spirit of the present disclosure. The present disclosure includes a combination of two or more preferable features described below.

Figure 1:
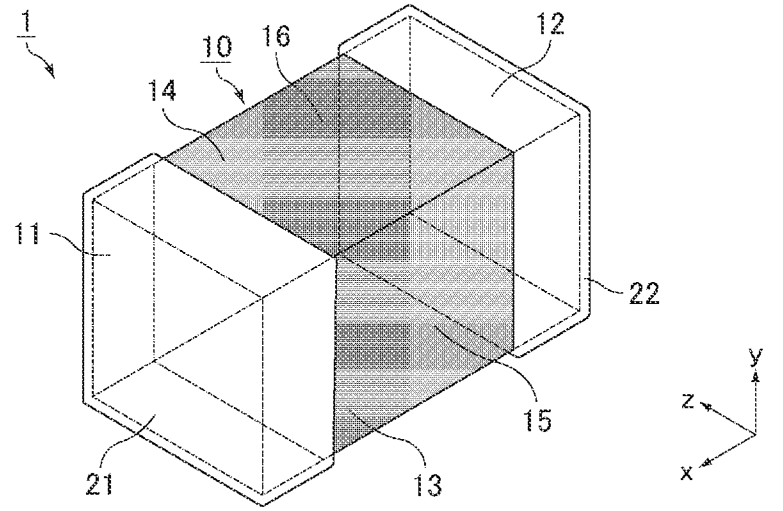
FIG. 1 schematically illustrates a perspective view of an example of a multilayer coil component according to an embodiment of the present disclosure.

FIG. 1 schematically illustrates a perspective view of an example of the multilayer coil component according to the embodiment of the present disclosure.

Figure 2A:
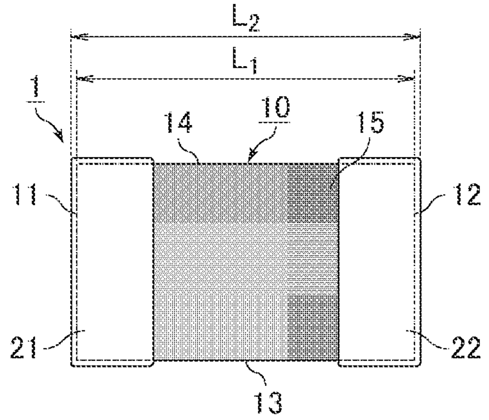
FIG. 2A is a side view of the multilayer coil component illustrated in FIG. 1.
Figure 2B:
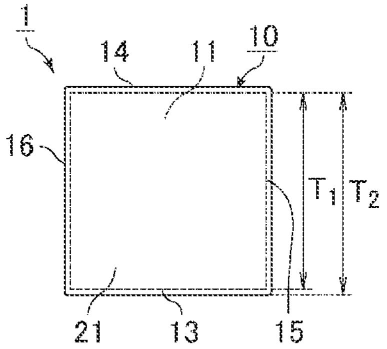
FIG. 2B is a front view of the multilayer coil component illustrated in FIG. 1.
Figure 2C:
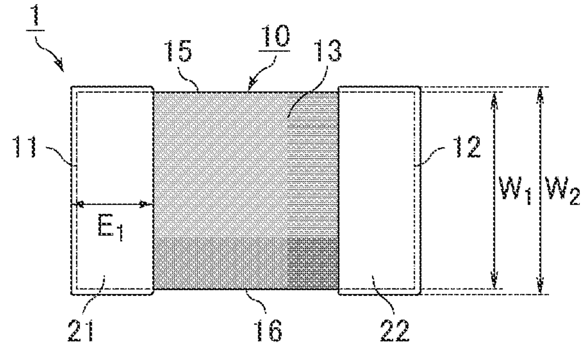
FIG. 2C is a bottom view of the multilayer coil component illustrated in FIG. 1.

FIG. 2A is a side view of the multilayer coil component illustrated in FIG. 1. FIG. 2B is a front view of the multilayer coil component illustrated in FIG. 1. FIG. 2C is a bottom view of the multilayer coil component illustrated in FIG. 1.

A multilayer coil component 1 illustrated in FIG. 1, FIG. 2A, FIG. 2B, and FIG. 2C includes a multilayer body 10, a first outer electrode 21, and a second outer electrode 22. The multilayer body 10 has a substantially rectangular cuboid having six surfaces. The multilayer body 10 includes insulating layers that are laminated in a length direction and contains a coil, and the structure thereof will be described later. The first outer electrode 21 and the second outer electrode 22 are electrically connected to the coil.

The length direction, the height direction, and the width direction of the multilayer coil component and the multilayer body according to the embodiment of the present disclosure correspond to a x-direction, a y-direction, and a z-direction in FIG. 1, respectively. The length direction (x-direction), the height direction (y-direction), and the width direction (z-direction) are perpendicular to each other.

As illustrated in FIG. 1, FIG. 2A, FIG. 2B, and FIG. 2C, the multilayer body 10 has a first end surface 11 and a second end surface 12 that face away from each other in the length direction (x-direction), a first main surface 13 and a second main surface 14 that face away from each other in the height direction (y-direction) perpendicular to the length direction, and a first side surface 15 and a second side surface 16 that face away from each other in the width direction (z-direction) perpendicular to the length direction and the height direction.

The multilayer body 10 preferably has rounded corners and rounded ridges although this is not illustrated in FIG. 1. At each corner, three surfaces of the multilayer body meet. Along each ridge, two surfaces of the multilayer body meet.

As illustrated in FIG. 1, FIG. 2A, FIG. 2B, and FIG. 2C, the first outer electrode 21 covers the entire first end surface 11 of the multilayer body 10, extends from the first end surface 11, and covers a part of the first main surface 13, a part of the second main surface 14, a part of the first side surface 15, and a part of the second side surface 16.

The second outer electrode 22 covers the entire second end surface 12 of the multilayer body 10, extends from the second end surface 12, and covers a part of the first main surface 13, a part of the second main surface 14, a part of the first side surface 15, and a part of the second side surface 16.

Since the first outer electrode 21 and the second outer electrode 22 are thus arranged, any one of the first main surface 13, the second main surface 14, the first side surface 15, and the second side surface 16 of the multilayer body 10 serves as a mounting surface when the multilayer coil component 1 is mounted on a substrate.

The size of the multilayer coil component according to the embodiment of the present disclosure is not particularly limited but is preferably 0603 size.

When the size of the multilayer coil component according to the embodiment of the present disclosure is the 0603 size, the length (length represented by a double-headed arrow $L_1$ in FIG. 2A) of the multilayer body is preferably 0.63 mm or less, is preferably 0.57 mm or more, more preferably no more than 0.60 mm (600 μm) and no less than 0.56 mm (560 μm) (i.e., from 0.56 mm to 0.60 mm).

When the size of the multilayer coil component according to the embodiment of the present disclosure is the 0603 size, the width (length represented by a double-headed arrow $W_1$ in FIG. 2C) of the multilayer body is preferably 0.33 mm or less and is preferably 0.27 mm or more (i.e., from 0.27 mm to 0.33 mm).

When the size of the multilayer coil component according to the embodiment of the present disclosure is the 0603 size, the height (length represented by a double-headed arrow $T_1$ in FIG. 2B) of the multilayer body is preferably 0.33 mm or less and is preferably 0.27 mm or more (i.e., from 0.27 mm to 0.33 mm).

When the size of the multilayer coil component according to the embodiment of the present disclosure is the 0603 size, the length (length represented by a double-headed arrow $L_2$ in FIG. 2A) of the multilayer coil component is preferably 0.63 mm or less and is preferably 0.57 mm or more (i.e., from 0.57 mm to 0.63 mm).

When the size of the multilayer coil component according to the embodiment of the present disclosure is the 0603 size, the width (length represented by a double-headed arrow $W_2$ in FIG. 2C) of the multilayer coil component is preferably 0.33 mm or less and is preferably 0.27 mm or more (i.e., from 0.27 mm to 0.33 mm).

When the size of the multilayer coil component according to the embodiment of the present disclosure is the 0603 size, the height (length represented by a double-headed arrow $T_2$ in FIG. 2B) of the multilayer coil component is preferably 0.33 mm or less and is preferably 0.27 mm or more (i.e., from 0.27 mm to 0.33 mm).

When the size of the multilayer coil component according to the embodiment of the present disclosure is the 0603 size, the length (length represented by a double-headed arrow $E_1$ in FIG. 2C) of a part of the first outer electrode that covers the first main surface of the multilayer body is preferably no less than 0.12 mm and no more than 0.22 mm (i.e., from 0.12 mm to 0.22 mm). Similarly, the length of a part of the second outer electrode that covers the first main surface of the multilayer body is preferably no less than 0.12 mm and no more than 0.22 mm (i.e., from 0.12 mm to 0.22 mm).

When the length of the part of the first outer electrode that covers the first main surface of the multilayer body and the length of the part of the second outer electrode that covers the first main surface of the multilayer body are not constant, the maximum length is preferably within the above range.

The coil that is contained in the multilayer body that is included in the multilayer coil component according to the embodiment of the present disclosure will be described.

The coil is formed by electrically connecting coil conductors that are laminated in the length direction together with the insulating layers to each other.

Figure 3:
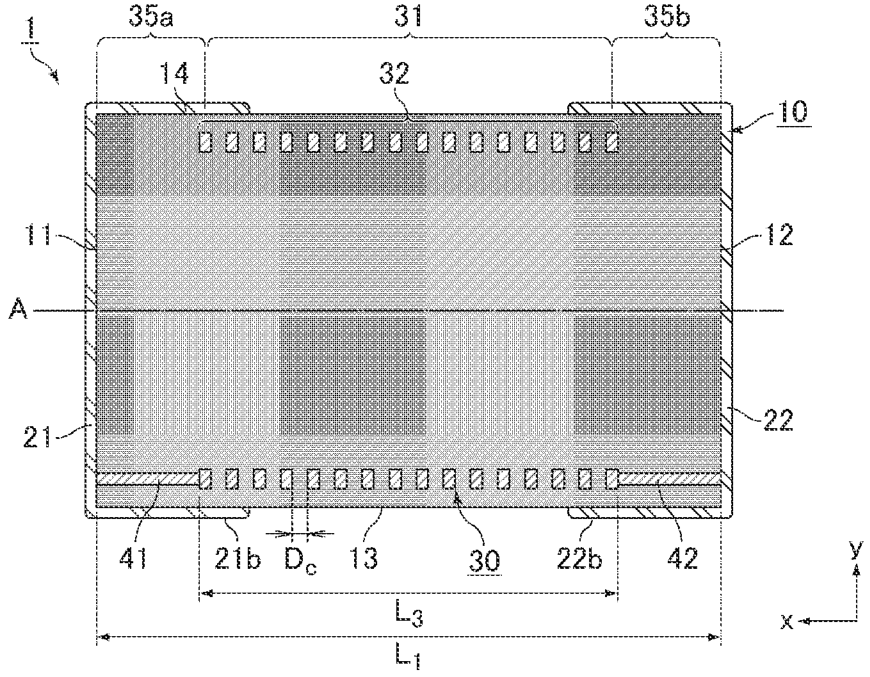
FIG. 3 schematically illustrates a sectional view of an example of the multilayer coil component according to the embodiment of the present disclosure.
Figure 4:
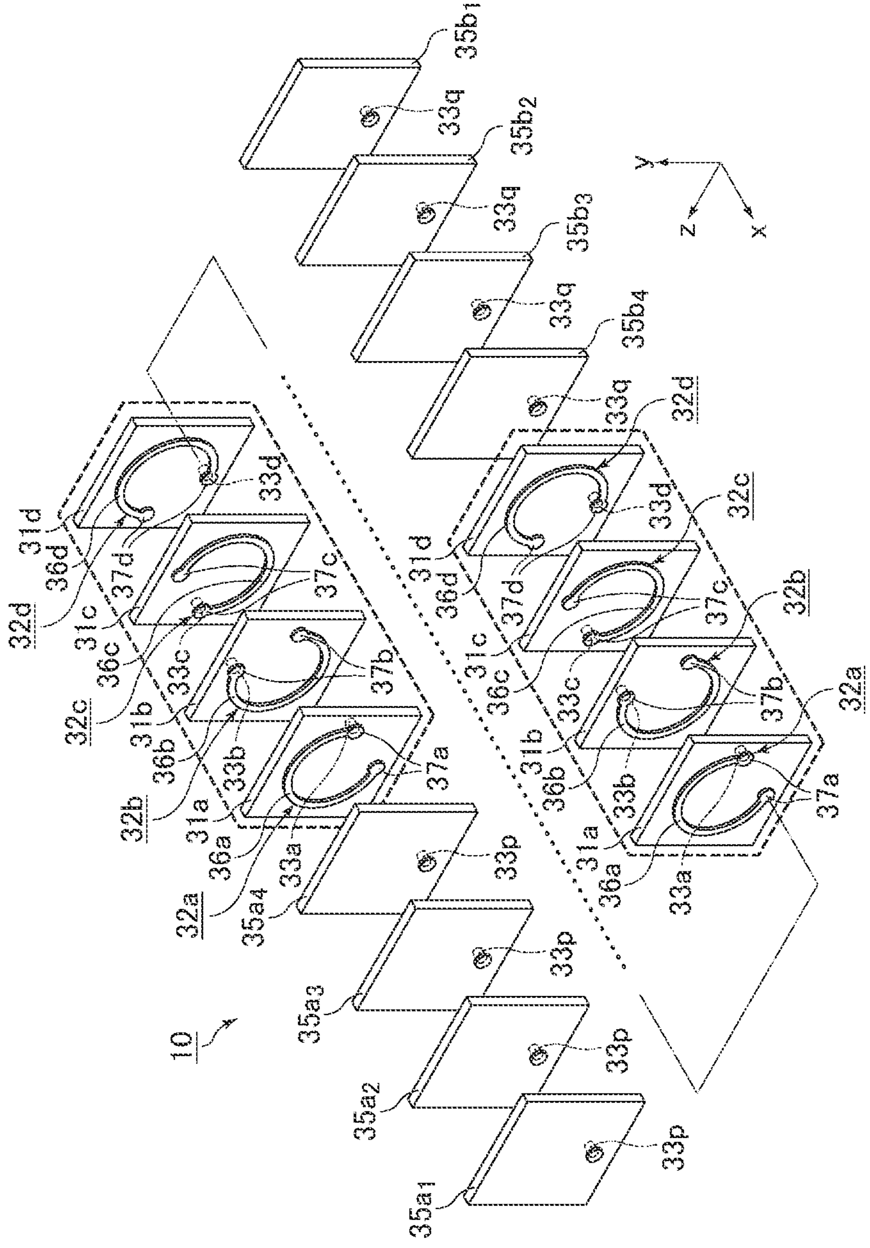
FIG. 4 schematically illustrates an exploded perspective view of insulating layers that are included in the multilayer coil component illustrated in FIG. 3.
Figure 5:
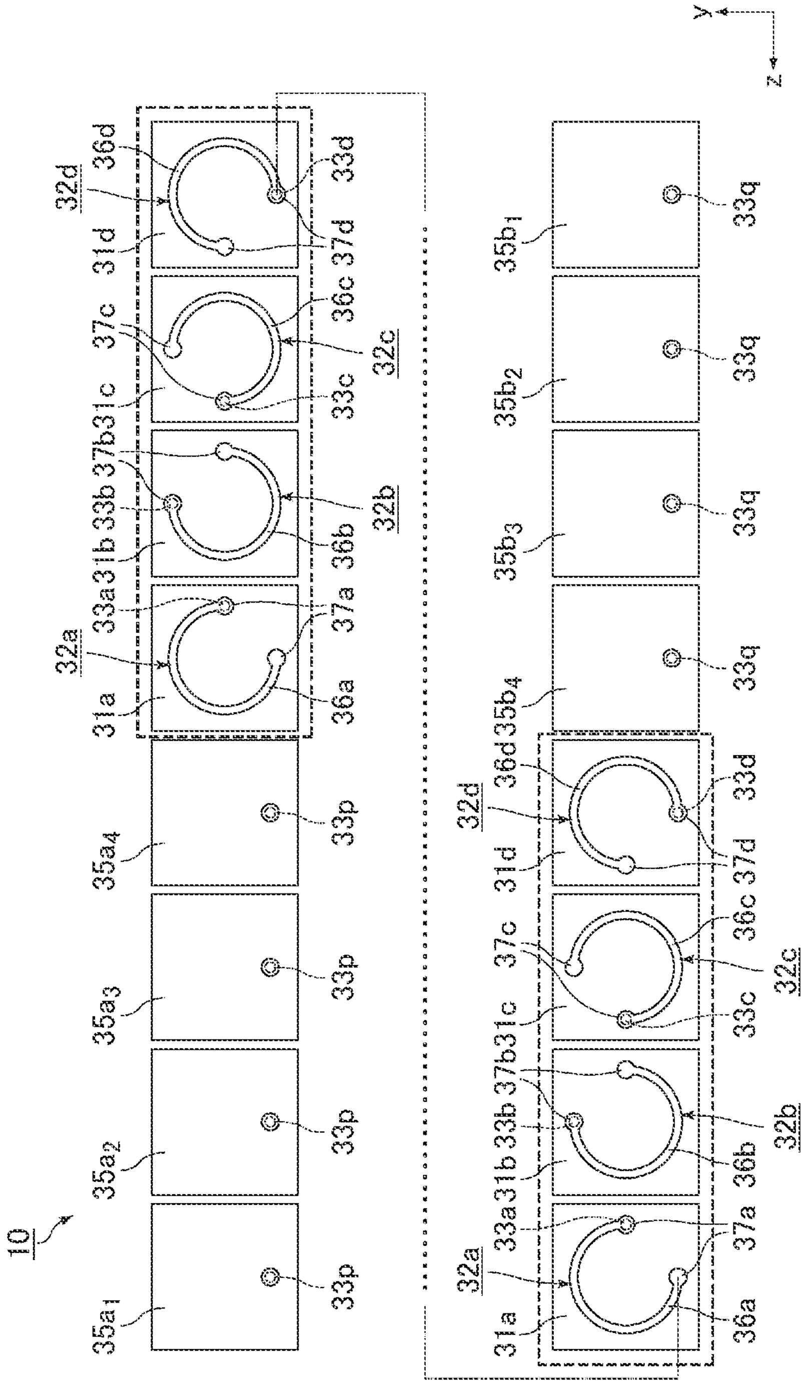
FIG. 5 schematically illustrates an exploded plan view of the insulating layers that are included in the multilayer coil component illustrated in FIG. 3.

FIG. 3 schematically illustrates a sectional view of an example of the multilayer coil component according to the embodiment of the present disclosure. FIG. 4 schematically illustrates an exploded perspective view of the insulating layers that are included in the multilayer coil component illustrated in FIG. 3. FIG. 5 schematically illustrates an exploded plan view of the insulating layers that are included in the multilayer coil component illustrated in FIG. 3.

FIG. 3 schematically illustrates the insulating layers, the coil conductors, connection conductors, and a lamination direction of the multilayer body but does not strictly illustrate, for example, actual shapes and connections. For example, the coil conductors are connected to each other with the via conductors interposed therebetween.

As illustrated in FIG. 3, the multilayer coil component 1 includes the multilayer body 10 that contains the coil that is formed by electrically connecting coil conductors 32 that are laminated together with the insulating layers to each other, and the first outer electrode 21 and the second outer electrode 22 that are electrically connected to the coil.

The multilayer body 10 has a region in which the coil conductors are disposed and a region in which a first connection conductor 41 or a second connection conductor 42 is disposed. The lamination direction of the multilayer body 10 and the axial direction (represented by a coil axis A in FIG. 3) of the coil are parallel to the first main surface 13.

A dimension $L_3$ of the region in which the coil conductors 32 are disposed in the lamination direction is preferably no less than 85% and no more than 95% (i.e., from 85% to 95%) of the length $L_1$ of the multilayer body 10, more preferably no less than 90% and no more than 95% (i.e., from 90% to 95%) of the length $L_1$. When the dimension $L_3$ of the region in which the coil conductors 32 are disposed in the lamination direction is no less than 85% and no more than 95% (i.e., from 85% to 95%) of the length of the multilayer body 10, the length of each connection conductor in the multilayer body decreases. This results in a decrease in a stray capacitance, and high-frequency characteristics are improved.

A distance $D_C$ between the coil conductors 32 adjacent to each other in the lamination direction of the multilayer body 10 is no less than 4 μm and no more than 8 μm (i.e., from 4 μm to 8 μm). When the distance $D_C$ between the coil conductors 32 adjacent to each other in the lamination direction of the multilayer body 10 is no less than 4 μm and no more than 8 μm (i.e., from 4 μm to 8 μm), the high-frequency characteristics are improved.

When the distance $D_C$ between the coil conductors adjacent to each other in the lamination direction is less than 4 μm, the stray capacitance increases, and the high-frequency characteristics are degraded. When the distance $D_C$ between the coil conductors adjacent to each other in the lamination direction is more than 8 μm, the inductance of the coil decreases.

As illustrated in FIG. 4 and FIG. 5, the multilayer body 10 includes insulating layers 31*a*, insulating layers 31*b*, insulating layers 31*c*, and insulating layers 31*d* as insulating layers 31 in FIG. 3. The multilayer body 10 includes an insulating layer 35*a*1, an insulating layer 35*a*2, an insulating layer 35*a*3, and an insulating layer 35*a*4 as insulating layers 35*a* in FIG. 3. The multilayer body 10 includes an insulating layer 35*b*1, an insulating layer 35*b*2, an insulating layer 35*b*3, and an insulating layer 35*b*4 as insulating layers 35*b* in FIG. 3.

A coil 30 includes coil conductors 32*a*, coil conductors 32*b*, coil conductors 32*c*, and coil conductors 32*d* as the coil conductors 32 in FIG. 3.

The coil conductors 32*a*, the coil conductors 32*b*, the coil conductors 32*c*, and the coil conductors 32*d* are disposed on the respective main surfaces of the insulating layers 31*a*, the insulating layers 31*b*, the insulating layers 31*c*, and the insulating layers 31*d*.

The lengths of the coil conductors 32*a*, the coil conductors 32*b*, the coil conductors 32*c*, and the coil conductors 32*d* are equal to the length of ¾ turns of the coil 30. That is, the number of the laminated coil conductors for forming 3 turns of the coil 30 is 4. In the multilayer body 10, the coil conductor 32*a*, the coil conductor 32*b*, the coil conductor 32*c*, and the coil conductor 32*d* are repeatedly laminated as a single unit (for 3 turns).

Each coil conductor 32*a* includes a line portion 36*a* and land portions 37*a* that are disposed at end portions of the line portion 36*a*. Each coil conductor 32*b* includes a line portion 36*b* and land portions 37*b* that are disposed at end portions of the line portion 36*b*. Each coil conductor 32*c* includes a line portion 36*c* and land portions 37*c* that are disposed at end portions of the line portion 36*c*. Each coil conductor 32*d* includes a line portion 36*d* and land portions 37*d* that are disposed at end portions of the line portion 36*d*.

Via conductors 33*a*, via conductors 33*b*, via conductors 33*c*, and via conductors 33*d* extend through the insulating layers 31*a*, the insulating layers 31*b*, the insulating layers 31*c*, and the insulating layers 31*d* in the lamination direction, respectively.

The insulating layer 31*a* with the coil conductor 32*a* and the via conductor 33*a*, the insulating layer 31*b* with the coil conductor 32*b* and the via conductor 33*b*, the insulating layer 31*c* with the coil conductor 32*c* and the via conductor 33*c*, and the insulating layer 31*d* with the coil conductor 32*d* and the via conductor 33*d* are repeatedly laminated as a single unit (surrounded by dotted lines in FIG. 4 and FIG. 5). In this way, the land portions 37*a* of the coil conductors 32*a*, the land portions 37*b* of the coil conductors 32*b*, the land portions 37*c* of the coil conductors 32*c*, and the land portions 37*d* of the coil conductors 32*d* are connected to each other with the via conductors 33*a*, the via conductors 33*b*, the via conductors 33*c*, and the via conductors 33*d* interposed therebetween. That is, the land portions of the coil conductors adjacent to each other in the lamination direction are connected to each other with the via conductors interposed therebetween.

The coil 30 that is a solenoid coil and that is contained in the multilayer body 10 is thus formed.

The coil 30 that includes the coil conductors 32*a*, the coil conductors 32*b*, the coil conductors 32*c*, and the coil conductors 32*d* may have a substantially circular shape or a substantially polygonal shape when viewed in the lamination direction. When the coil 30 is viewed in the lamination direction and has the substantially polygonal shape, the diameter of the coil 30 is defined as the diameter of a circle having an area corresponding to the area of the substantially polygonal shape, and the coil axis of the coil 30 is defined as an axis that passes through the center of gravity of the substantially polygonal shape and that extends in the lamination direction.

As illustrated in FIG. 5, the diameters of the land portions 37*a*, the land portions 37*b*, the land portions 37*c*, and the land portions 37*d* are preferably larger than the line widths of the line portions 36*a*, the line portions 36*b*, the line portions 36*c*, and the line portions 36*d* when viewed in the lamination direction.

The land portions 37*a*, the land portions 37*b*, the land portions 37*c*, and the land portions 37*d* may have a substantially circular shape or a substantially polygonal shape illustrated in FIG. 5 when viewed in the lamination direction. When the land portions 37*a*, the land portions 37*b*, the land portions 37*c*, and the land portions 37*d* are viewed in the lamination direction and have the substantially polygonal shape, the diameter of each land portion is defined as the diameter of a circle having an area corresponding to the area of the substantially polygonal shape.

Via conductors 33*p* extend through the insulating layer 35*a*1, the insulating layer 35*a*2, the insulating layer 35*a*3, and the insulating layer 35*a*4 in the lamination direction. Land portions that are connected to the via conductors 33*p* may be disposed on the respective main surfaces of the insulating layer 35*a*1, the insulating layer 35*a*2, the insulating layer 35*a*3, and the insulating layer 35*a*4.

The insulating layer 35*a*1 with the via conductor 33*p*, the insulating layer 35*a*2 with the via conductor 33*p*, the insulating layer 35*a*3 with the via conductor 33*p*, and the insulating layer 35*a*4 with the via conductor 33*p* are laminated so as to overlap the insulating layers 31*a* with the coil conductors 32*a* and the via conductors 33*a*. In this way, the via conductors 33*p* are connected to each other to form the first connection conductor 41, and the first connection conductor 41 is exposed from the first end surface 11. Consequently, the first outer electrode 21 and the coil 30 are connected to each other with the first connection conductor 41 interposed therebetween.

The first connection conductor 41 preferably linearly connects the first outer electrode 21 and the coil 30 to each other as described above. That the first connection conductor 41 linearly connects the first outer electrode 21 and the coil 30 to each other means the via conductors 33*p* that form the first connection conductor 41 overlap when viewed in the lamination direction. The via conductors 33*p* may not be strictly arranged linearly.

Via conductors 33*q* extend through the insulating layer 35*b*1, the insulating layer 35*b*2, the insulating layer 35*b*3, and the insulating layer 35*b*4 in the lamination direction. Land portions that are connected to the via conductors 33*q* may be disposed on the respective main surfaces of the insulating layer 35*b*1, the insulating layer 35*b*2, the insulating layer 35*b*3, and the insulating layer 35*b*4.

The insulating layer 35*b*1 with the via conductor 33*q*, the insulating layer 35*b*2 with the via conductor 33*q*, the insulating layer 35*b*3 with the via conductor 33*q*, and the insulating layer 35*b*4 with the via conductor 33*q* are laminated so as to overlap the insulating layers 31*d* with the coil conductors 32*d* and the via conductors 33*d*. In this way, the via conductors 33*q* are connected to each other to form the second connection conductor 42, and the second connection conductor 42 is exposed from the second end surface 12. Consequently, the second outer electrode 22 and the coil 30 (the coil conductors 32*d*) are connected to each other with the second connection conductor 42 interposed therebetween.

The second connection conductor 42 preferably linearly connects the second outer electrode 22 and the coil 30 to each other as described above. That the second connection conductor 42 linearly connects the second outer electrode 22 and the coil 30 to each other means the via conductors 33*q* that form the second connection conductor 42 overlap when viewed in the lamination direction. The via conductors 33*q* may not be strictly arranged linearly.

In the case where the land portions are connected to the via conductors 33*p* that form the first connection conductor 41 and the via conductors 33*q* that form the second connection conductor 42, the shape of the first connection conductor 41 and the shape of the second connection conductor 42 mean shapes except for the land portions.

In an example illustrated in FIG. 4 and FIG. 5, the number of the coil conductors that are laminated to form 3 turns of the coil 30 is 4, that is, a repetitive shape is a shape of ¾ turns. However, the number of the coil conductors that are laminated to form 1 turn of the coil is not particularly limited.

For example, the number of the coil conductors that are laminated to form 1 turn of the coil may be 2, that is, the repetitive shape may be a shape of ½ turns.

The coil conductors that form the coil preferably overlap when viewed in the lamination direction. The shape of the coil is preferably a substantially circular shape when viewed in the lamination direction. In the case where the coil includes the land portions, the shape of the coil means a shape except for the land portions (that is, the shape of each line portion).

In the case where the land portions are connected to the via conductors that form the connection conductors, the shape of each connection conductor means a shape except for the land portions (that is, the shape of each via conductor).

The repetitive pattern of the coil conductors illustrated in FIG. 4 is in the form of a substantially circular shape. However, the coil conductors may be such that the repetitive pattern has a substantially polygonal shape such as a substantially quadrilateral shape.

The repetitive shape of the coil conductors may not be a shape of ¾ turns but may be a shape of ½ turns.

Figure 6:
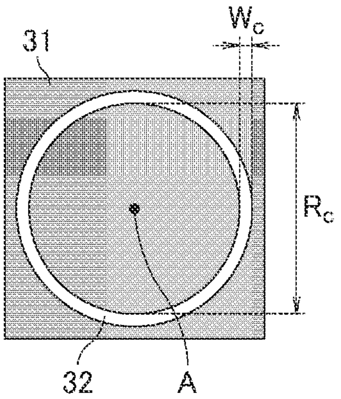
FIG. 6 schematically illustrates a plan view of a repetitive shape of coil conductors.

FIG. 6 schematically illustrates a plan view of the repetitive shape of the coil conductors. As illustrated in FIG. 6, the repetitive shape of the coil conductors 32 is a substantially circular. The inner diameter Re of each coil conductor 32 is no less than 50 μm and no more than 100 μm (i.e., from 50 μm to 100 μm). The width We of each line portion that forms the coil conductors 32 is no less than 30 μm and no more than 50 μm (i.e., from 30 μm to 50 μm).

When the distance between the coil conductors adjacent to each other in the lamination direction is no less than 4 μm and no more than 8 μm (i.e., from 4 μm to 8 μm), the width of the line portion of each coil conductor is no less than 30 μm and no more than 50 μm (i.e., from 30 μm to 50 μm), and the inner diameter of the coil conductor is no less than 50 μm and no more than 100 μm (i.e., from 50 μm to 100 μm), the stray capacitance between the coil conductors adjacent to each other in the lamination direction decreases. Accordingly, the high-frequency characteristics are improved, and the transmission coefficient S21 at 50 GHz can be −1.2 dB or more.

When the transmission coefficient S21 of the multilayer coil component at 50 GHz is −1.2 dB or more, for example, the multilayer coil component can be appropriately used for a Bias-Tee circuit in an optical communication circuit. The transmission coefficient S21 is calculated from a ratio of the power of a transmission signal to an input signal. The transmission coefficient S21 for every frequency is calculated with, for example, a network analyzer. The transmission coefficient S21 is basically a dimensionless quantity and is typically expressed by a unit of dB with a common logarithm.

The width of each line portion is no less than 30 μm and no more than 50 μm (i.e., from 30 μm to 50 μm), preferably no less than 30 μm and no more than 40 μm (i.e., from 30 μm to 40 μm). When the line width of the line portion is less than 30 μm, the direct current resistance of the coil increases. When the line width of the line portion is more than 50 μm, the electrostatic capacity of the coil increases, and the high-frequency characteristics of the multilayer coil component are degraded.

When the width of the line portion is no less than 30 μm and no more than 40 μm (i.e., from 30 μm to 40 μm), the transmission coefficient S21 of the multilayer coil component at 50 GHz can be −1.0 dB or more.

The inner diameter of each coil conductor is no less than 50 μm and no more than 100 μm (i.e., from 50 μm to 100 μm), preferably no less than 50 μm and no more than 80 μm (i.e., from 50 μm to 80 μm). When the inner diameter of the coil conductor is less than 50 μm, the inductance of the coil decreases. When the inner diameter of the coil conductor is more than 100 μm, the electrostatic capacity of the coil increases, and the high-frequency characteristics of the multilayer coil component are degraded.

When the inner diameter of the coil conductor is no less than 50 μm and no more than 80 μm (i.e., from 50 μm to 80 μm), the transmission coefficient S21 of the multilayer coil component at 50 GHz can be −1.0 dB or more.

The distance between the coil conductors adjacent to each other in the lamination direction is no less than 4 μm and no more than 8 μm (i.e., from 4 μm to 8 μm), preferably no less than 5 μm and no more than 7 μm (i.e., from 5 μm to 7 μm). When the distance between the coil conductors adjacent to each other in the lamination direction is no less than 5 μm and no more than 7 μm (i.e., from 5 μm to 7 μm), the transmission coefficient S21 of the multilayer coil component at 50 GHz can be −1.0 dB or more.

The outer circumferential edge of each land portion is preferably in contact with the inner circumferential edge of the corresponding line portion when the coil conductors are viewed in the lamination direction. In this way, the area of the land portion located outside the outer circumferential edge of the line portion sufficiently decreases, and the stray capacitance due to the land portion sufficiently decreases. Accordingly, the high-frequency characteristics of the multilayer coil component are further improved.

The shape of each land portion when viewed in the lamination direction may be a substantially circular shape or a substantially polygonal shape. When the shape of the land portion is the substantially polygonal shape, the diameter of the land portion is defined as the diameter of a circle having an area corresponding to the area of the substantially polygonal shape.

The thickness of the coil conductors is not particularly limited but is preferably no less than 3 μm and no more than 6 μm (i.e., from 3 μm to 6 μm).

The number of the laminated coil conductors is not particularly limited but is preferably no less than 40 and no more than 60 (i.e., from 40 to 60). When the number of the laminated coil conductors is less than 40, the stray capacitance increases, and the transmission coefficient S21 decreases. When the number of the laminated coil conductors is more than 60, the direct current resistance (Rdc) increases. When the number of the laminated coil conductors is no less than 40 and no more than 60 (i.e., from 40 to 60), the transmission coefficient S21 at 50 GHz can be improved.

In the multilayer coil component according to the embodiment of the present disclosure, it is preferable that each land portion be not located inside the inner circumferential edge of the corresponding line portion and partly overlap the line portion when viewed in the lamination direction.

When the land portion is located inside the inner circumferential edge of the line portion, the impedance decreases in some cases.

The diameter of the land portion is preferably no less than 1.05 times the line width of the line portion and no more than 1.3 times the line width of the line portion (i.e., from 1.05 times the line width of the line portion to 1.3 times the line width of the line portion) when viewed in the lamination direction.

When the diameter of the land portion is less than 1.05 times the line width of the line portion, the land portion and the corresponding via conductor are insufficiently connected to each other in some cases. When the diameter of the land portion is more than 1.3 times the line width of the line portion, the stray capacitance due to the land portion increases, and the high-frequency characteristics are degraded in some cases.

In the present specification, the distance between the coil conductors adjacent to each other in the lamination direction means the minimum distance in the lamination direction between the coil conductors that are connected to each other with a via interposed therebetween. Accordingly, the distance between the coil conductors adjacent to each other in the lamination direction does not necessarily coincide with the distance between the coil conductors that cause the stray capacitance.

In the multilayer coil component according to the embodiment of the present disclosure, the mounting surface is not particularly limited, but the first main surface is preferably the mounting surface.

When the first main surface is the mounting surface, the first outer electrode preferably extends so as to cover a part of the first end surface and a part of the first main surface, and the second outer electrode preferably extends so as to cover a part of the second end surface and a part of the first main surface.

An example of the shape of each outer electrode when the first main surface is the mounting surface will be described with reference to FIG. 7, FIG. 8A, FIG. 8B, and FIG. 8C.

Figure 7:
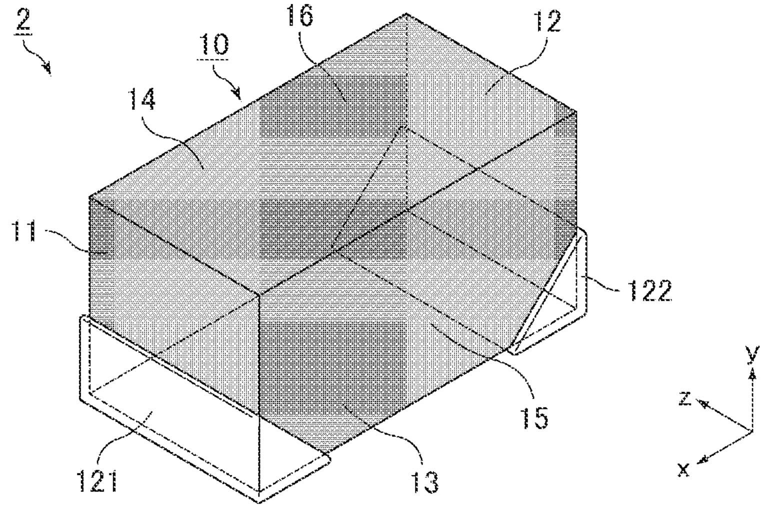
FIG. 7 schematically illustrates a perspective view of another example of a multilayer coil component according to the embodiment of the present disclosure.
Figure 8A:
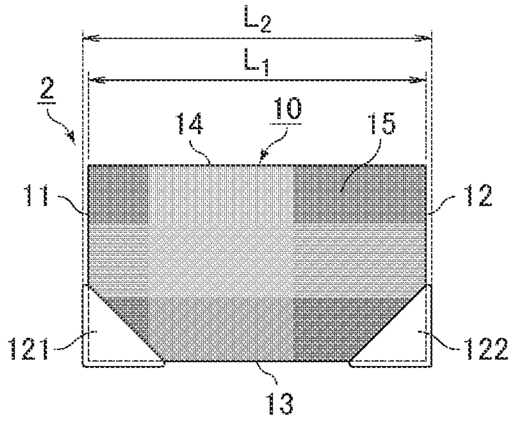
FIG. 8A is a side view of the multilayer coil component illustrated in FIG. 7.
Figure 8B:
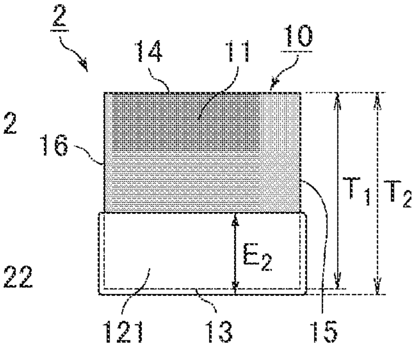
FIG. 8B is a front view of the multilayer coil component illustrated in FIG. 7.
Figure 8C:
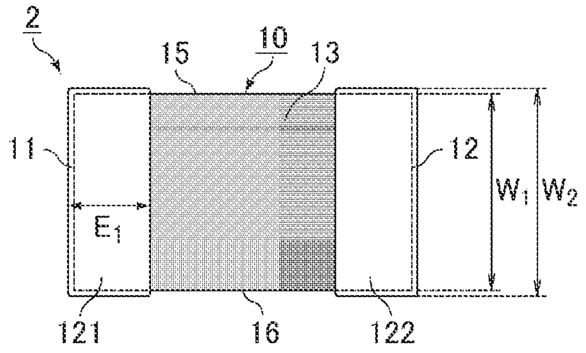
FIG. 8C is a bottom view of the multilayer coil component illustrated in FIG. 7.

FIG. 7 schematically illustrates a perspective view of another example of a multilayer coil component according to the embodiment of the present disclosure. FIG. 8A is a side view of the multilayer coil component illustrated in FIG. 7. FIG. 8B is a front view of the multilayer coil component illustrated in FIG. 7. FIG. 8C is a bottom view of the multilayer coil component illustrated in FIG. 7.

A multilayer coil component 2 illustrated in FIG. 7, FIG. 8A, FIG. 8B, and FIG. 8C includes the multilayer body 10, a first outer electrode 121, and a second outer electrode 122. The structure of the multilayer body 10 is the same as that of the multilayer body 10 that is included in the multilayer coil component 1 illustrated in FIG. 1, FIG. 2A, FIG. 2B, and FIG. 2C.

As illustrated in FIG. 7 and FIG. 8B, the first outer electrode 121 covers a part of the first end surface 11 of the multilayer body 10. As illustrated in FIG. 7 and FIG. 8C, the first outer electrode 121 extends from the first end surface 11 and covers a part of the first main surface 13. As illustrated in FIG. 8B, the first outer electrode 121 covers a region that contains the ridge along which the first end surface 11 meets the first main surface 13 but may extend from the first end surface 11 and cover the second main surface 14.

In FIG. 8B, a part of the first outer electrode 121 that covers the first end surface 11 of the multilayer body 10 has a constant height. The shape of the first outer electrode 121 is not particularly limited, provided that the first outer electrode 121 covers the part of the first end surface 11 of the multilayer body 10. For example, the part of the first outer electrode 121 on the first end surface 11 of the multilayer body 10 may have a substantially arching shape that bulges from end portions toward a central portion. In FIG. 8C, a part of the first outer electrode 121 that covers the first main surface 13 of the multilayer body 10 has a constant length. The shape of the first outer electrode 121 is not particularly limited, provided that the first outer electrode 121 covers the part of the first main surface 13 of the multilayer body 10. For example, the part of the first outer electrode 121 on the first main surface 13 of the multilayer body 10 may have a substantially arching shape that bulges from end portions toward a central portion.

As illustrated in FIG. 7 and FIG. 8A, the first outer electrode 121 may further extend from the first end surface 11 and the first main surface 13 and cover a part of the first side surface 15 and a part of the second side surface 16. In this case, as illustrated in FIG. 8A, the parts of the first outer electrode 121 that cover the first side surface 15 and the second side surface 16 are preferably formed at an angle with respect to the ridges along which the first side surface 15 and the second side surface 16 meet the first end surface 11 and the first main surface 13. The first outer electrode 121 may not cover the part of the first side surface 15 and the part of the second side surface 16.

The second outer electrode 122 covers a part of the second end surface 12 of the multilayer body 10, extends from the second end surface 12, and covers a part of the first main surface 13. The second outer electrode 122 covers a region of the second end surface 12 that contains the ridge along which the second end surface 12 meets the first main surface 13 as in the first outer electrode 121.

The second outer electrode 122 may extend from the second end surface 12 and cover a part of the second main surface 14, a part of first side surface 15, and a part of the second side surface 16 as in the first outer electrode 121.

The shape of the second outer electrode 122 is not particularly limited, provided that the second outer electrode 122 covers the part of the second end surface 12 of the multilayer body 10 as in the first outer electrode 121. For example, the part of the second outer electrode 122 on the second end surface 12 of the multilayer body 10 may have a substantially arching shape that bulges from end portions toward a central portion. The shape of the second outer electrode 122 is not particularly limited, provided that the second outer electrode 122 covers the part of the first main surface 13 of the multilayer body 10. For example, the part of the second outer electrode 122 on the first main surface 13 of the multilayer body 10 may have a substantially arching shape that bulges from end portions toward a central portion.

The second outer electrode 122 may further extend from the second end surface 12 and the first main surface 13 and cover the part of the second main surface 14, the part of the first side surface 15, and the part of the second side surface 16 as in the first outer electrode 121. In this case, the parts of the second outer electrode 122 that cover the first side surface 15 and the second side surface 16 are preferably formed at an angle with respect to the ridges along which the first side surface 15 and the second side surface 16 meet the second end surface 12 and the first main surface 13. The second outer electrode 122 may not cover the part of the second main surface 14, the part of the first side surface 15, and the part of the second side surface 16.

Since the first outer electrode 121 and the second outer electrode 122 are thus arranged, the first main surface 13 of the multilayer body 10 serves as the mounting surface when the multilayer coil component 2 is mounted on a substrate.

The height (length represented by a double-headed arrow $E_2$ in FIG. 8B) of the part of the first outer electrode that covers the first end surface of the multilayer body is preferably no less than 0.10 mm and no more than 0.20 mm (i.e., from 0.10 mm to 0.20 mm). Similarly, the height of the part of the second outer electrode that covers the second end surface of the multilayer body is preferably no less than 0.10 mm and no more than 0.20 mm (i.e., from 0.10 mm to 0.20 mm). In this case, the stray capacitance due to each outer electrode can be decreased.

The height of the part of the first outer electrode that covers the first end surface of the multilayer body and the height of the part of the second outer electrode that covers the second end surface of the multilayer body are not constant, the maximum height is preferably within the above range.

The multilayer coil component 2 illustrated in FIG. 7, FIG. 8A, FIG. 8B, and FIG. 8C can decrease the stray capacitance more than the multilayer coil component 1 and improves the high-frequency characteristics because the areas in which the outer electrodes are disposed are smaller than those of the multilayer coil component 1 illustrated in FIG. 1, FIG. 2A, FIG. 2B, and FIG. 2C.

In the case where the shapes of the outer electrodes illustrated in FIG. 7, FIG. 8A, FIG. 8B, and FIG. 8C are used, the first connection conductor and the second connection conductor are preferably connected to a portion of the coil conductor nearest to the first main surface. In this way, the height $E_2$ of the first outer electrode 121 and the second outer electrode 122 that cover the first end surface and the second end surface can be decreased. The decrease in the height $E_2$ enables the stray capacitance between each outer electrode and the coil to be decreased and improves the high-frequency characteristics.

Method of Manufacturing Multilayer Coil Component

An example of a method of manufacturing a multilayer coil component according to the embodiment of the present disclosure will be described.

A ceramic green sheet to be the insulating layers is first manufactured. For example, an organic binder such as a polyvinyl butyral resin, an organic solvent such as ethanol or toluene, and a dispersant are added in a ferrite material and kneaded to form a slurry. Subsequently, a ceramic green sheet having a thickness of about 10 to 25 μm is manufactured by, for example, a doctor blade method.

When the thickness of the ceramic green sheet is about 10 to 25 μm, the distance between the coil conductors adjacent to each other in the lamination direction in the multilayer body is readily adjusted to no less than 4 μm and no more than 8 μm (i.e., from 4 μm to 8 μm).

The ferrite material is prepared, for example, in the following manner.

Oxidizable materials such as iron, nickel, zinc, and copper are mixed and pre-fired at about 800° C. for about 1 hour. Subsequently, a pre-fired material that is obtained is pulverized with a ball mill and dried to prepare a Ni—Zn—Cu ferrite material (powder of mixed oxides) having an average particle diameter of about 2 μm.

In the case where the ceramic green sheet is manufactured with the ferrite material, the composition of the ferrite material is preferably $Fe_2O_3$ in an amount of no less than 40 mol % and no more than 49.5 mol % (i.e., from 40 mol % to 49.5 mol %), ZnO in an amount of no less than 5 mol % and no more than 35 mol % (i.e., from 5 mol % and no more than 35 mol %), CuO in an amount of no less than 4 mol % and no more than 12 mol % (i.e., from 4 mol % to 12 mol %), and a rest of NiO and a small amount of additive (containing inevitable impurities).

Examples of the material of the ceramic green sheet may include a non-magnetic material such as a glass ceramic material and a mixed material of a magnetic material and a non-magnetic material in addition to a magnetic material such as a ferrite material.

Subsequently, conductor patterns to be a coil conductor and a via conductor are formed in the ceramic green sheet. For example, a via hole having a diameter of no less than 20 μm and no more than 30 μm (i.e., from 20 μm to 30 μm) is formed in the ceramic green sheet by a laser process. The via hole is filled with a conductive paste such as an Ag paste to form the conductor pattern for the via conductor. The conductor pattern for the coil conductor that has a thickness of about 11 μm is formed on a main surface of the ceramic green sheet with a conductive paste such as an Ag paste by, for example, screen printing. An example of the conductor pattern for the coil conductor is a conductor pattern corresponding to the coil conductor illustrated in FIG. 4 and FIG. 5.

At this time, the shape of the conductor pattern for the coil conductor is such that the coil diameter of the obtained coil conductor is no less than 50 μm and no more than 100 μm (i.e., from 50 μm to 100 μm) and the width of the line portion is no less than 30 μm and no more than 50 μm (i.e., from 30 μm to 50 μm).

Subsequently, these are dried to obtain a coil sheet in which the conductor pattern for the coil conductor and the conductor pattern for the via conductor are formed in the ceramic green sheet. In the coil sheet, the conductor pattern for the coil conductor and the conductor pattern for the via conductor are connected to each other.

In addition to the coil sheet, a via sheet is manufactured by forming a conductor pattern for a via conductor in a ceramic green sheet. The conductor pattern for the via conductor of the via sheet is a conductor pattern to be a via conductor for forming a connection conductor.

Subsequently, the coil sheets are laminated in a predetermined order such that the coil that has the coil axis parallel to the mounting surface is to be formed in the multilayer body after separation and firing.

The via sheets are laminated above and below the multilayer body of the coil sheets.

The number of the laminated coil sheets is preferably no less than 40 and no more than 60 (i.e., from 40 to 60).

Subsequently, the multilayer body of the coil sheets and the via sheets is subjected to thermo-compression bonding to obtain a bonded body, and the bonded body is cut to obtain individual chips each having a predetermined chip size. For example, barrel polishing may be performed on the individual chips to round the corners and ridges thereof.

Subsequently, a binder removing process is performed on the individual chips at a predetermined temperature for a period of time, and a firing process is performed on the individual chips at a predetermined temperature for a period of time to form the multilayer body (fired body) that contains the coil. At this time, the conductor pattern for the coil conductor and the conductor pattern for the via conductor become the coil conductor and the via conductor after firing. The coil is formed by connecting the coil conductors to each other with the via conductors interposed therebetween. The lamination direction of the multilayer body and the axial direction of the coil are parallel to the mounting surface.

Subsequently, the multilayer body is dipped in the vertical direction in a layer formed by elongating a conductive paste such as an Ag paste to have a predetermined thickness and baked to form underlying electrodes for the outer electrodes on five surfaces (an end surface, main surfaces, and end surfaces) of the multilayer body.

The multilayer body can be obliquely dipped in a layer formed by elongating a conductive paste such as an Ag paste to have a predetermined thickness and baked to form underlying electrodes for the outer electrodes on four surfaces (a main surface, an end surface, and side surfaces) of the multilayer body.

Subsequently, Ni films and Sn films that have predetermined thicknesses are successively formed on the underlying electrodes by plating. Consequently, the outer electrodes are formed.

In this way, the multilayer coil component according to the embodiment of the present disclosure is manufactured.

EXAMPLE

In the following example, the multilayer coil component according to the embodiment of the present disclosure will be described in more detail. The present disclosure, however, is not limited to the example.

Manufacture of Samples

Sample 1

(1) A ferrite material (pre-fired powder) having a predetermined composition was prepared.

(2) The pre-fired powder, an organic binder (polyvinyl butyral resin), an organic solvent (ethanol and toluene), and a PSZ ball were put in a pot mill, sufficiently mixed, and pulverized in a wet manner to prepare a magnetic slurry.

(3) The magnetic slurry was molded into a sheet by a doctor blade method. Ceramic green sheets each having a thickness of about 12 μm were manufactured by being punched out from the sheet.

(4) A conductive paste containing Ag powder and an organic vehicle for internal conductors was prepared.

Manufacture of Via Sheet (5) The ceramic green sheets were irradiated with a laser beam at predetermined locations to form via holes. The via holes were filled with the conductive paste to form the via conductors. The conductive paste was applied around the via holes into a substantially circular shape by screen printing to form the land portions.

Manufacture of Coil Sheet (6) After the via holes were formed at the predetermined locations of the ceramic green sheets and filled with the conductive paste to form the via conductors, the coil conductors including the land portions and the line portions were formed by printing to obtain the coil sheets.

(7) These sheets were laminated in the order illustrated in FIG. 4 and FIG. 5 such that the number of the laminated coil conductors was 56, heated, pressurized, and cut into individual pieces with a dicer to manufacture a multilayer laminated body.

(8) The multilayer laminated body was put in a furnace. A binder removing process was performed at a temperature of about 500° C. in the atmosphere. Subsequently, a multilayer body (fired body) was manufactured by firing at a temperature of about 900° C. The dimensions of the obtained 30 multilayer bodies were measured with a micrometer and the average thereof was calculated. The result was that L=0.60 mm, W=0.30 mm, and T=0.30 mm.

(9) A conductive paste containing Ag powder and glass frit for the outer electrodes was poured into a coating-film formation tank to form a coating film having a predetermined thickness. Portions of the multilayer body at which the outer electrodes were to be formed were dipped into the coating film.

(10) After dipping, underlying electrodes for the outer electrodes were formed by baking at a temperature of about 800° C.

(11) Ni films and Sn films were successively formed on the underlying electrodes by electroplating to form the outer electrodes.

In this way, a multilayer coil component (sample 1) including the outer electrodes having the shape illustrated in FIG. 1, FIG. 2A, FIG. 2B, and FIG. 2C and the internal structure of the multilayer body illustrated in FIG. 3, FIG. 4, and FIG. 5 was manufactured.

In the sample 1, the distance $D_C$ between the coil conductors adjacent to each other in the lamination direction was 4 μm, the inner diameter Re of the coil was 100 μm, and the width We of each line portion was 30 μm. The thickness of the coil conductor was 6 μm. The dimension of the region in which the coil conductors were disposed in the lamination direction was 93.3% of the length of the multilayer body.

Measurement of Transmission Coefficient S21

Figure 9:
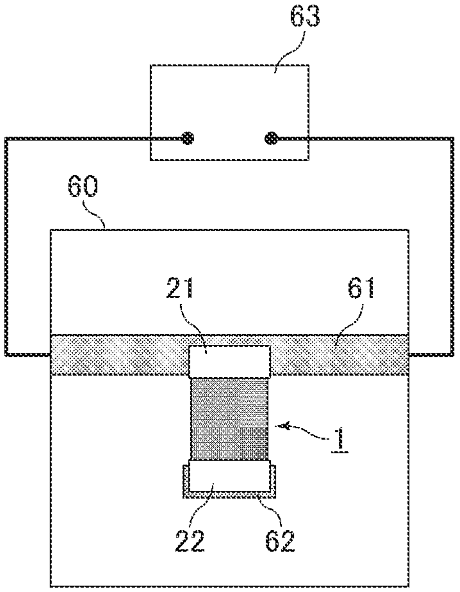
FIG. 9 schematically illustrates a method of measuring a transmission coefficient S21.

FIG. 9 schematically illustrates a method of measuring the transmission coefficient S21.

As illustrated in FIG. 9, the sample (multilayer coil component 1) was soldered to a measurement jig 60 including a signal path 61 and a ground conductor 62. The first outer electrode 21 of the multilayer coil component 1 was connected to the signal path 61. The second outer electrode 22 was connected to the ground conductor 62.

Power of the input signal to the sample and the transmission signal was obtained with a network analyzer 63, and the frequency was changed to measure the transmission coefficient S21. One terminal and the other terminal of the signal path 61 were connected to the network analyzer 63.

Figure 10:
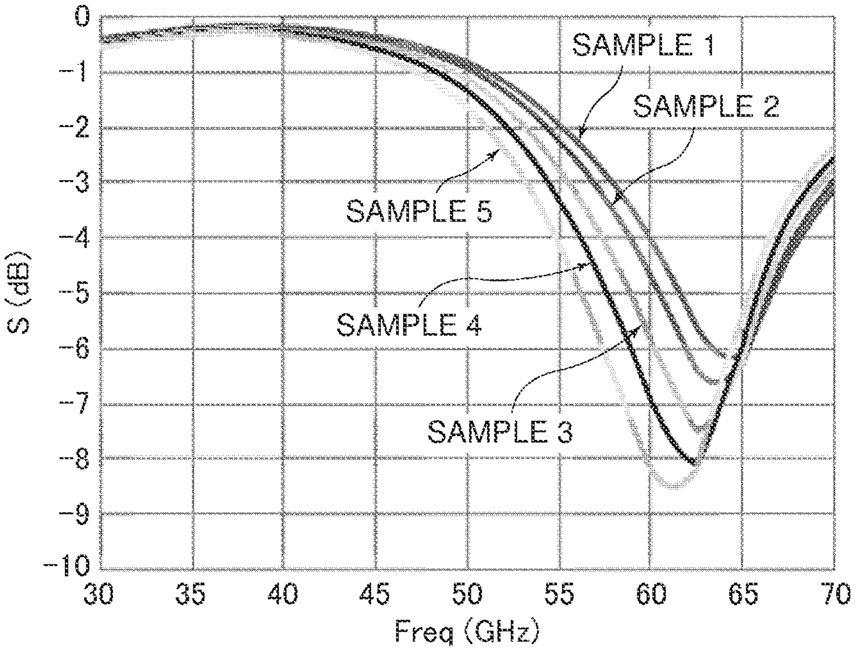
FIG. 10 is a graph illustrating the transmission coefficient S21 of samples 1 to 5.

The result of measurement is illustrated in FIG. 10. The transmission coefficient S21 at 60 GHz is illustrated in Table 1. FIG. 10 is a graph illustrating the transmission coefficient S21 of the samples manufactured in the example. The transmission coefficient S21 indicates that the closer the value thereof to 0 dB, the less the loss.

Samples 2 to 16

Multilayer coil components (Samples 2 to 16) were manufactured in the same manner as in the sample 1 except that the distance De between the coil conductors adjacent to each other in the lamination direction, the inner diameter Re of the coil, and the width We of each line portion were changed as illustrated in Table 1. The transmission coefficient S21 was measured. The result is illustrated in Table 1, FIG. 10, FIG. 11, FIG. 12, and FIG. 13.

Figure 11:
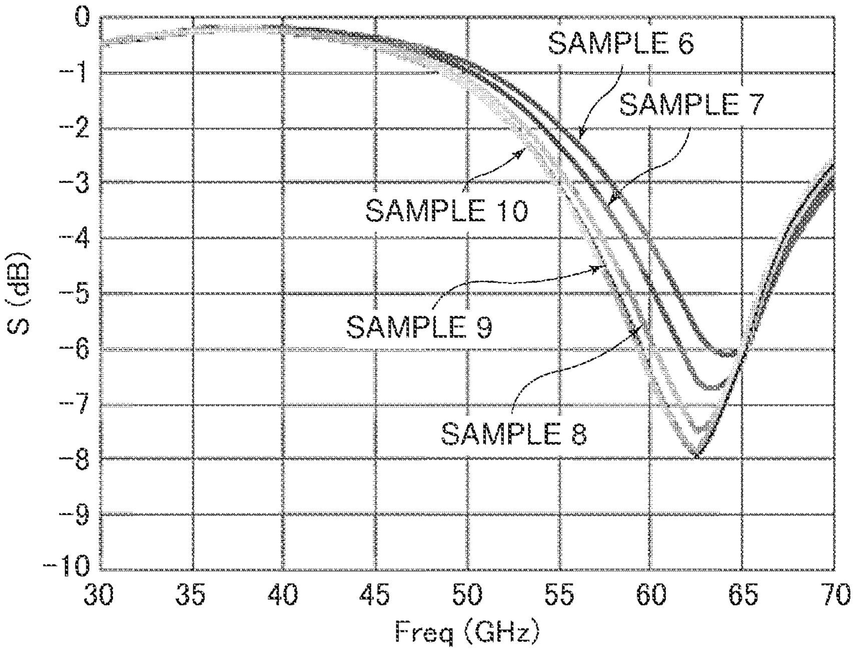
FIG. 11 is a graph illustrating the transmission coefficient S21 of samples 6 to 10.
Figure 12:
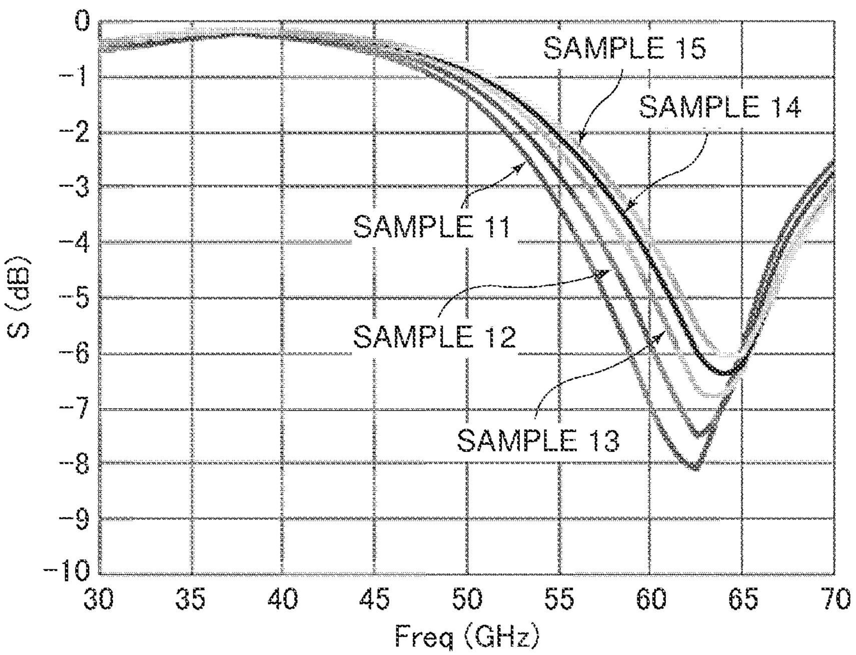
FIG. 12 is a graph illustrating the transmission coefficient S21 of samples 11 to 15.
Figure 13:
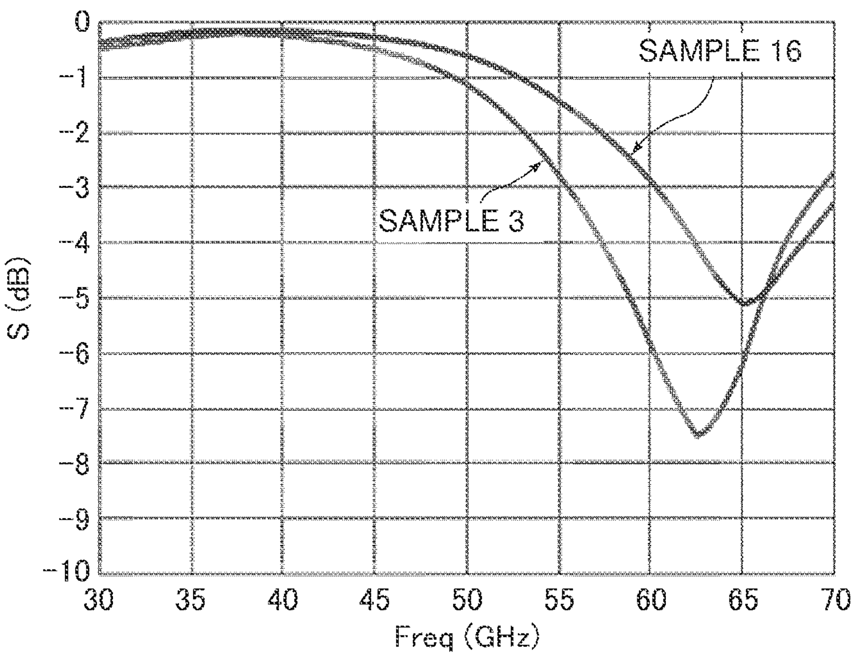
FIG. 13 is a graph illustrating the transmission coefficient S21 of samples 3 and 16.

FIG. 10 is a graph illustrating the transmission coefficient S21 of the samples 1 to 5. FIG. 11 is a graph illustrating the transmission coefficient S21 of the samples 6 to 10. FIG. 12 is a graph illustrating the transmission coefficient S21 of the samples 11 to 15. FIG. 13 is a graph illustrating the transmission coefficient S21 of the samples 3 and 16.

Regarding all of the samples, a proportion of the dimension of the region in which the coil conductors were disposed in the lamination direction to the length of the multilayer body was 93.3% as in the sample 1.

Regarding the samples 11 to 16, the dimension of the region in which the coil conductors were disposed and the thickness of each coil conductor were not changed, but the number of the laminated coil conductors and the thickness of the ceramic green sheet were changed. Regarding the sample 3, the sample 8, and the sample 12, the distance between the coil conductors adjacent to each other in the lamination direction, the inner diameter of the coil, and the width of each line portion were the same as each other.

TABLE 1

| Sample | Distance $D_C$ between Coil Conductors Adjacent to Each Other in Lamination Direction [μm] | Inner Diameter $R_c$ of Coil [μm] | Width $W_c$ of Line Portion [μm] | Transmission Coefficient S21 at 50 GHz [dB] |
|---|---|---|---|---|
| 1 | 4 | 100 | 30 | −0.82 |
| 2 | | | 40 | −0.93 |
| 3 | | | 50 | −1.13 |
| 4* | | | 60 | −1.34 |
| 5* | | | 70 | −1.64 |
| 6 | 4 | 60 | 50 | −0.82 |
| 7 | | 80 | | −0.96 |
| 8 | | 100 | | −1.13 |
| 9* | | 120 | | −1.25 |
| 10* | | 140 | | −1.24 |
| 11* | 3 | 100 | 50 | −1.34 |
| 12 | 4 | | | −1.13 |
| 13 | 5 | | | −0.97 |
| 14 | 6 | | | −0.87 |
| 15 | 7 | | | −0.80 |
| 16 | 7 | 50 | 30 | −0.60 |

From the result in Table 1, it is revealed that the multilayer coil component according to the embodiment of the present disclosure has a transmission coefficient S21 of −1.2 dB or more at 50 GHz and excellent high-frequency characteristics.

It is also revealed that the transmission coefficient S21 at 50 GHz can be −1.0 dB or more when the width We of each line portion is no less than 30 μm and no more than 40 μm (i.e., from 30 μm to 40 μm), the inner diameter Re of the coil is no less than 50 μm and no more than 80 μm (i.e., from 50 μm to 80 μm), or the distance De between the coil conductors adjacent to each other in the lamination direction is no less than 5 μm and no more than 7 μm (i.e., from 5 μm to 7 μm).

From the result of the sample 16, it is revealed that the transmission coefficient S21 at 50 GHz can be further decreased when the width We of each line portion is no less than 30 μm and no more than 40 μm (i.e., from 30 μm to 40 μm), the inner diameter $R_c$ of the coil is no less than 50 μm and no more than 80 μm (i.e., from 50 μm to 80 μm), and the distance De between the coil conductors adjacent to each other in the lamination direction is no less than 5 μm and no more than 7 μm (i.e., from 5 μm to 7 μm).

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:

a multilayer body that includes insulating layers laminated in a length direction and that contain a coil; and a first outer electrode and a second outer electrode that are electrically connected to the coil, wherein the coil includes coil conductors that are laminated in the length direction together with the insulating layers and that are electrically connected to each other, wherein the multilayer body has a first end surface and a second end surface that face each other in the length direction, a first main surface and a second main surface that face each other in a height direction perpendicular to the length direction, and a first side surface and a second side surface that face each other in a width direction perpendicular to the length direction and the height direction, wherein the first outer electrode covers the entire first end surface, wherein the second outer electrode covers the entire second end surface, wherein a lamination direction of the multilayer body and an axial direction of the coil are parallel to the first main surface, wherein a distance between the coil conductors adjacent to each other in the lamination direction is from 4 μm to 8 μm, wherein each coil conductor includes a line portion and a land portion that is disposed at an end portion of the line portion, wherein the land portions of the coil conductors adjacent to each other in the lamination direction are connected to each other with a via conductor interposed therebetween, wherein a width of the line portion is from 30 μm to 50 μm, wherein the first outer electrode extends from the first end surface, and covers a part of the first main surface, a part of the second main surface, a part of the first side surface, and a part of the second side surface, and wherein when viewed in a direction orthogonal to the axial direction of the coil, the first outer electrode overlaps a portion of the coil conductor.

2. The multilayer coil component according to claim 1, wherein the width of the line portion is from 30 μm to 40 μm.

3. The multilayer coil component according to claim 2, wherein the distance between the coil conductors adjacent to each other in the lamination direction is from 5 μm to 7 μm.

4. The multilayer coil component according to claim 2, wherein a number of the coil conductors that are laminated is from 40 to 60.

5. The multilayer coil component according to claim 2, wherein a length of the multilayer body is from 560 μm to 600 μm.

6. The multilayer coil component according to claim 2, wherein a length of a region in which the coil conductors are disposed in the lamination direction is in a range of from 85% to 95% of a length of the multilayer body.

7. The multilayer coil component according to claim 2, wherein a length of a region in which the coil conductors are disposed in the lamination direction is in a range of from 90% to 95% of a length of the multilayer body.

8. The multilayer coil component according to claim 2, wherein the first main surface is a mounting surface, the first outer electrode extends so as to cover the portion of the first end surface and a portion of the first main surface, and the second outer electrode extends so as to cover the portion of the second end surface and a portion of the first main surface.

9. The multilayer coil component according to claim 1, wherein the distance between the coil conductors adjacent to each other in the lamination direction is from 5 μm to 7 μm.

10. The multilayer coil component according to claim 9, wherein a number of the coil conductors that are laminated is from 40 to 60.

11. The multilayer coil component according to claim 9, wherein a length of the multilayer body is from 560 μm to 600 μm.

12. The multilayer coil component according to claim 1, wherein a number of the coil conductors that are laminated is from 40 to 60.

13. The multilayer coil component according to claim 1, wherein a length of the multilayer body is from 560 μm to 600 μm.

14. The multilayer coil component according to claim 1, wherein a length of a region in which the coil conductors are disposed in the lamination direction is in a range of from 85% to 95% of a length of the multilayer body.

15. The multilayer coil component according to claim 1, wherein a length of a region in which the coil conductors are disposed in the lamination direction is in a range of from 90% to 95% of a length of the multilayer body.

16. The multilayer coil component according to claim 1, wherein the first main surface is a mounting surface, the first outer electrode extends so as to cover the portion of the first end surface and a portion of the first main surface, and the second outer electrode extends so as to cover the portion of the second end surface and a portion of the first main surface.

17. A bias-tee circuit in an optical communication circuit having the multilayer coil component according to claim 1.

* * * * *